United States Patent
Jaber

(10) Patent No.: US 6,878,658 B2
(45) Date of Patent: Apr. 12, 2005

(54) HIGH TEMPERATURE ZIEGLER-NATTA SOLUTION CATALYSTS

(75) Inventor: Isam Jaber, Calgary (CA)

(73) Assignee: Nova Chemicals (International) S.A. (CH)

( * ) Notice: Subject to any disclaimer, the term of this patent is extended or adjusted under 35 U.S.C. 154(b) by 154 days.

(21) Appl. No.: 10/314,796

(22) Filed: Dec. 9, 2002

(65) Prior Publication Data

US 2003/0130108 A1 Jul. 10, 2003

(30) Foreign Application Priority Data

Dec. 18, 2001 (CA) ............................................. 2365718

(51) Int. Cl.$^7$ ........................... B01J 31/00; B01J 37/00; C08F 4/02; C08F 4/60
(52) U.S. Cl. ...................... 502/103; 502/113; 502/117; 502/232
(58) Field of Search ................................ 502/103, 113, 502/117, 232

(56) References Cited

U.S. PATENT DOCUMENTS

| | | | | |
|---|---|---|---|---|
| 4,295,992 A | | 10/1981 | Gibbs ..................... | 252/429 C |
| 4,612,300 A | | 9/1986 | Coleman, III ............... | 502/113 |
| 5,614,654 A | * | 3/1997 | Miyake et al. ................ | 556/10 |
| 6,130,300 A | * | 10/2000 | Jaber ....................... | 526/124.5 |
| 6,194,342 B1 | * | 2/2001 | Parodi et al. ............... | 502/127 |
| 6,200,922 B1 | * | 3/2001 | Huffer et al. ............... | 502/120 |
| 6,339,036 B1 | * | 1/2002 | Jaber ......................... | 502/117 |
| 6,632,770 B2 | * | 10/2003 | Holtcamp ................... | 502/158 |
| 6,730,753 B2 | * | 5/2004 | Fottinger et al. .......... | 526/128 |

\* cited by examiner

*Primary Examiner*—Mark L. Bell
*Assistant Examiner*—Jennine M. Brown
(74) *Attorney, Agent, or Firm*—Kenneth H. Johnson

(57) ABSTRACT

The present invention provides a Ziegler-Natta catalyst useful in solution processes for the polymerization of olefins having a low amount of aluminum and magnesium. The catalysts of the present invention contain an alkyl silanol and have a molar ratio of Si:Ti from 0.25:1 to 4:1. The catalysts are effective for the solution polymerization of olefins at high temperatures.

6 Claims, No Drawings

HIGH TEMPERATURE ZIEGLER-NATTA SOLUTION CATALYSTS

FIELD OF THE INVENTION

The present invention relates to new catalyst systems for the polymerization of olefins. The catalyst system comprises a mixture of (i) a dialkyl magnesium compound; (ii) an aluminum alkyl compound; (iii) a silanol; (iv) an alkyl halide; (v) a transition metal halide; and optionally (vi) either a dialkyl aluminum alkoxide or a trialkyl aluminum compound. The catalyst systems are particularly useful as catalysts systems used in the solution polymerization of olefins and particularly for the polymerization of co- and homopolymers of ethylene.

BACKGROUND OF THE INVENTION

U.S. Pat. No. 6,130,300 issued Oct. 10, 2000 to Jaber discloses a low aluminum and magnesium Ziegler-Natta system. The catalyst comprises a mixture of an aluminum alkyl compound and a dialkyl magnesium compound, an alkyl halide, a titanium halide and a dialkyl aluminum alkoxide. The patent does not suggest that a silanol could be used in the catalyst. Additionally, the present invention contemplates some cases where the dialkyl aluminum alkoxide is absent.

U.S. Pat. No. 4,295,992 issued Oct. 20, 1981 to Gibbs teaches preparing a catalyst support by reacting an alcohol, an organo magnesium compound and a silicon halide. The present invention has eliminated the essential alcohol from the teaching of U.S. Pat. No. 4,295,992.

U.S. Pat. No. 4,612,300 issued Sep. 16, 1986 to Coleman, III teaches a Ziegler Natta catalyst in which one component is a soluble organomagnesium component of the formula $MgR''_{2-x}MR''_y$, in which M may be Al, Zn, Si, Sn, B or P. There is no significant teaching regarding the possible use of silicon containing compounds. Further the catalyst requires the presence of a vanadium compound which has been eliminated from the catalysts of the present invention.

The present invention seeks to provide a catalyst useful in high temperature solution polymerization.

SUMMARY OF THE INVENTION

Accordingly, the present invention seeks to provide a catalyst consisting essentially of a mixture of:
(i) a magnesium compound of the formula $(R^2)_2Mg$ wherein $R^2$ is a $C_{1-10}$ alkyl radical;
(ii) an alkyl aluminum compound of the formula $(R^1)_{3-a}Al^1(OR^5)_a$ and, wherein $R^1$ and $R^5$ are independently selected from the group consisting of $C_{1-10}$ alkyl radicals and a is 0 or 1;
(iii) a silicon containing compound of the formula:

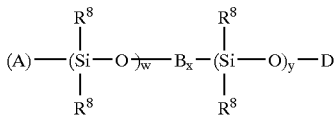

wherein each A is independently selected from the group consisting of $C_{1-20}$ alkyl radicals; $C_{1-20}$ alkoxide radicals; $C_{6-14}$ aryl radicals; $C_{6-14}$ aryl oxide radicals; and a hydroxy radical, B is selected from the group consisting of divalent $C_{1-10}$ alkyl radicals and divalent $C_{6-14}$ aryl radicals which is unsubstituted or up to fully substituted by one or more $C_{1-10}$ alkyl radicals, D is selected from the group consisting of a hydrogen atom, $C_{1-20}$ alkyl radicals; $C_{1-20}$ alkoxide radicals; $C_{6-14}$ aryl radicals; $C_{6-14}$ aryl oxide radicals; an amine radical or the formula $NR^9R^{10}$ where $R^9$ and $R^{10}$ are independently selected from the group consisting of a hydrogen atom, a hydroxyl radical, a $C_{1-10}$ alkyl radical; a radical of the formula $SO_2CF_3$; a radical of the formula $SO_2C_6F_5$; a radical of the formula S—$R^9$ where $R^9$ is as defined above; a radical of the formula $OSO_2R^{11}$ wherein $R^{11}$ is selected from the group consisting of $C_{1-20}$ alkyl radicals, and $C_{6-14}$ aryl radicals, a hydrogen atom; or a group 1, 2 or 3 metal, each $R^8$ is selected from the group consisting of a hydrogen atom, a $C_{1-4}$ alkyl radical, a $C_{1-4}$ alkoxide radical, a $C_{6-14}$ aryl radical; a $C_{6-14}$ aryl oxide radical; w is an integer from 1 to 5, x is 0 or 1, and y is 0 or 1, provided the silicon compound contains a functional group or atom which reacts with the above aluminum compound;
(iv) a halide of the formula $R^3X$, wherein $R^3$ is a $C_{1-8}$ alkyl radical and x is a halide selected from the group consisting of chlorine and bromine;
(v) transition metal halide, preferably titanium tetrachloride, to provide a molar ratio of Mg to $Al^1$ from 2.0:1 to 12:1; Mg:transition metal (e.g. Ti) from 3 to 8; a molar ratio of $Al^1$ to transition metal (e.g. Ti) from 0.25:1 to 4:1; a molar ratio of halide to Mg from 1.6:1 to 2.7:1; a molar ratio of Si:Ti from 0.25:1 to 4:1 and a molar ratio of $Al^1$:Si from 0.25:1 to 4:1; and
(vi) optionally an alkyl aluminum compound of the formula $R^4{}_{3-b}Al^2(OR^7)_b$
wherein $R^4$ and $R^7$ are independently selected from the group consisting of $C_{1-10}$ alkyl radicals and b is 1 or 0 to provide: a molar ratio of $Al^2$ to transition metal (e.g. Ti) from 0:1 to 5:1.

In a further embodiment, the present invention provides a process for the polymerization of a mixture consisting of at least 40 weight % of ethylene and up to 60 weight % of one or more $C_{3-12}$ olefins comprising contacting said monomer mixture in a hydrocarbon solvent at a temperature from 105° C. to 320° C. and a pressure from 4 to 20 mPa with a catalyst consisting essentially of a mixture of:
(i) a magnesium compound of the formula $(R^2)_2Mg$ wherein $R^2$ is a $C_{1-10}$ alkyl radical;
(ii) an alkyl aluminum compound of the formula $(R^1)_{3-a}Al^1(OR^5)_a$ and, wherein $R^1$ and $R^5$ are independently selected from the group consisting of $C_{1-10}$ alkyl radicals and a is 0 or 1;
(iii) a silicon containing compound of the formula:

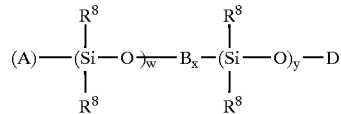

wherein each A is independently selected from the group consisting of $C_{1-20}$ alkyl radicals; $C_{1-20}$ alkoxide radicals; $C_{6-14}$ aryl radicals; $C_{6-14}$ aryl oxide radicals; and a hydroxy radical, B is selected from the group consisting of divalent $C_{1-10}$ alkyl radicals and divalent $C_{6-14}$ aryl radicals which is unsubstituted or up to fully substituted by one or more $C_{1-10}$ alkyl radicals, D is selected from the group consisting of a hydrogen atom, $C_{1-20}$ alkyl radicals; $C_{1-20}$ alkoxide radicals; $C_{6-14}$ aryl radicals; $C_{6-14}$ aryl oxide radicals; an amine radical or the formula $NR^9R^{10}$ where $R^9$ and $R^{10}$ are independently selected from the group consisting of a hydrogen atom, a hydroxyl radical, a $C_{1-10}$ alkyl radical; a radical of the formula $SO_2CF_3$; a radical of the formula $SO_2C_6F_5$; a radical of the formula S—$R^9$ where $R^9$ is as defined above; a radical of the formula $OSO_2R^{11}$ wherein $R^{11}$ is selected from the group consisting of $C_{1-20}$ alkyl radicals, and $C_{6-14}$ aryl radicals, a hydrogen atom; or a group 1, 2 or 3 metal, each $R^8$ is selected from the group consisting of a hydrogen atom, a $C_{1-4}$ alkyl radical and a $C_{1-4}$ alkoxide radical, a $C_{6-14}$ aryl radical; and a $C_{6-14}$ aryl oxide radical, w is an integer from 1 to 5, x is 0 or 1, and y is 0 or 1, provided the silicon compound contains a functional group or atom which reacts with the above aluminum compound;

(iv) a halide of the formula $R^3X$, wherein $R^3$ is a $C_{1-8}$ alkyl radical and x is a halide selected from the group consisting of chlorine and bromine;

(v) transition metal halide, preferably titanium tetrachloride, to provide a molar ratio of Mg to $Al^1$ from 2.0:1 to 12:1; Mg:transition metal (e.g. Ti) from 3 to 8; a molar ratio of $Al^1$ to transition metal (e.g. Ti) from 0.25:1 to 4:1; a molar ratio of halide to Mg from 1.6:1 to 2.7:1; a molar ratio of Si:Ti from 0.25:1 to 4:1 and a molar ratio of $Al^1$:Si from 0.25:1 to 4:1; and (vi) optionally an alkyl aluminum compound of the formula $(R^4)_{3-b}Al^2(OR^7)_b$, wherein $R^4$ and $R^7$ are independently selected from the group consisting of $C_{1-10}$ alkyl radicals and b is 1 or 0 to provide: a molar ratio of $Al^2$ to transition metal (e.g. Ti) from 0:1 to 5:1

(vii) optionally an alkyl aluminum compound of the formula $(R^4)_{3-b}Al^2(OR^7)_b$, wherein $R^4$ and $R^7$ are independently selected from the group consisting of $C_{1-10}$ alkyl radicals and b is 1 or 0 to provide a molar ratio of $Al^2$ to transition metal (e.g. Ti) from 0:1 to 5:1.

Best Mode

There are a number of types of polymers of alpha olefins which may be made. For example, the polymer may be a liquid polymer or a waxy polymer having a low molecular weight. On the other hand, the polymer may have a very high molecular weight and have excellent physical properties but may be difficult to process. The present invention is directed to "useful" polymers of alpha olefins. In practical terms the polymer should have a melt index as determined by ASTM D 1238 (190° C./2.16 kg) of up to 200 dg/min. ASTM means the American Standard Test Method and the conditions of the test are at 190° C. and under a load of 2.16 kg. While the melt index may be fractional the lowest melt index would be that useful for extrudable polymers. Typical ranges would include melt indexes from 0.1 to 150, most typically from 0.1 to 120 dg/min.

The process of the present invention may be used to prepare homopolymers of ethylene and copolymers of ethylene and higher alpha-olefins having densities in the range of, for example, about 0.900–0.970 g/cm$^3$ and especially 0.910–0.965 g/cm$^3$; the polymers of higher density, e.g. about 0.960 and above, being homopolymers. Such polymers may have a melt index, as measured by the method of ASTM D-1238, condition E, in the range of, for example, 0.1–200 dg/min, typically from about 0.1 to 150 dg/min, and especially in the range of about 0.1 to 120 dg/min. The polymers may be manufactured with narrow or broad molecular weight distribution. For example, the polymers may have a stress exponent, a measure of the molecular weight distribution, in the range of about 1.1–2.5 and especially in the range of about 1.3–2.0. Stress exponent is determined by measuring the throughput of a melt indexer at two stresses (2160 g and 6480 g loading) using the proce dures of the ASTM melt index test method, and the following formula:

Stress Exponent=1/(0.477)×(Log. wt extruded with 6480 g weight)/ wt. extruded with 2160 g wt).

Stress exponent values of less than about 1.40 indicate narrow molecular weight distribution while values above about 1.70 indicate broad molecular weight distribution.

The present invention is directed to a process for the preparation of useful polymers of alpha-olefins, such polymers being intended for fabrication into articles by extrusion, injection molding, thermoforming, rotational molding and the like. In particular, the polymers of alpha-olefins are homopolymers of ethylene and copolymers of ethylene and higher alpha-olefins, i.e. alpha-olefins of the ethylene series, especially such higher alpha-olefins having 3 to 12 carbon atoms, i.e. $C_{3-12}$ alpha-olefins, examples of which include 1-butene, 1-hexene and 1-octene. The preferred higher alpha-olefins have 4–10 carbon atoms. In addition, cyclic endomethylenic dienes may be fed to the process with the ethylene or mixtures of ethylene and $C_{3-12}$ alpha-olefin. The monomer feed typically comprises at least 40, preferably 60, most preferably 80 weight % of ethylene and up to 60, typically up to 40, preferably up to 20 weight % of one or more comonomers selected from the group consisting of $C_{3-12}$ olefins. Such polymers are known per se.

In the process of the present invention, monomer, generally one or more hydrocarbyl monomers, a coordination catalyst and inert hydrocarbon solvent and optionally hydrogen are fed to a reactor. The monomer may be ethylene or mixtures of ethylene and at least one $C_{3-12}$ alpha-olefin, preferably ethylene or mixtures of ethylene and at least one $C_{4-10}$ alpha-olefin.

The solvent used in the preparation of the coordination catalyst is an inert $C_{6-10}$ hydrocarbon which may be unsubstituted or substituted by a $C_{1-4}$ alkyl radical such as a hydrocarbon that is inert with respect to the coordination catalyst. Such solvents are known and include for example, hexane, heptane, octane, cyclohexane, methylcyclohexane and hydrogenated naphtha. The solvent used in the preparation of the catalyst is preferably the same as that fed to the reactor for the polymerization process. Caution should be exercised in selecting a solvent as a saturated monomer is not desired as a solvent for the reaction (i.e. hexane would not be preferred solvent for a hexene containing monomer).

The process of the present invention may be practiced over a wide range of temperatures that may be used in an alpha-olefin polymerization process operated under solution conditions. For example, such polymerization temperatures may be in the range of 105° C. to 320° C., preferably in the range of 130° C. to 260° C., most preferably in the range from 180° C. to 250° C. However, one of the considerations in selecting the temperature is that the polymer should remain in solution.

The pressures used in the process of the present invention are those known for solution polymerization processes, for example, pressures in the range of about 4 to 20 mPa, preferably from 8 to 20 mPa.

In the process of the present invention, the alpha-olefin monomers are polymerized in the reactor in the presence of the catalyst. Pressure and temperature are controlled so that the polymer formed remains in solution.

Optionally, small amounts of hydrogen, for example 0–100 parts per million based on the total solution fed to the reactor, may be added to the feed in order to improve control of the melt index and/or molecular weight and thus aid in the production of a more uniform product, as is disclosed in Canadian Patent 703,704.

The coordination catalyst is formed from five, or optionally six components. The first component is a dialkyl magnesium compound of the formula $(R^2)_2Mg$ wherein each $R^2$ is independently (i.e. each $R^2$ may be the same or different) a $C_{1-10}$, preferably a $C_{2-6}$, alkyl radical. Some useful magnesium compounds include diethyl magnesium and ethyl butyl magnesium.

The second component is a first aluminum compound of the formula $(R^1)_{3-a}Al^1(OR^5)_a$ and, wherein $R^1$ and $R^5$ are independently selected from the group consisting of $C_{1-10}$, preferably $C_{1-4}$ alkyl radicals and a is 0 or 1.

In a particularly preferred embodiment of the present invention the aluminum compound is triethyl aluminum.

The third component in the catalyst is a silicon-containing compound of the formula:

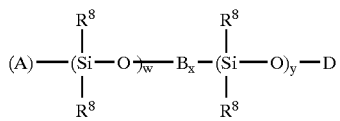

wherein each A is independently selected from the group consisting of $C_{1-20}$, preferably $C_{1-10}$ alkyl radicals; $C_{1-20}$, preferably $C_{1-10}$ alkoxide radicals; $C_{6-14}$, preferably $C_{6-12}$, aryl radicals; $C_{6-14}$, preferably $C_{6-12}$, aryl oxide radicals; and a hydroxy radical, B is selected from the group consisting of divalent $C_{1-10}$, preferably $C_{1-4}$, alkyl radicals and divalent $C_{6-14}$, preferably $C_{6-12}$, aryl radicals which are unsubstituted or up to fully substituted by one or more $C_{1-10}$, preferably $C_{1-4}$, alkyl radicals, D is selected from the group consisting of $C_{1-20}$, preferably $C_{1-10}$, alkyl radicals; $C_{1-20}$, preferably $C_{1-10}$, alkoxide radicals; $C_{6-14}$, preferably $C_{6-12}$, aryl radicals; $C_{6-14}$, preferably $C_{6-12}$, aryl oxide radicals; an amine radical or the formula $NR^9R^{10}$ where $R^9$ and $R^{10}$ are independently selected from the group consisting of a hydrogen atom, a hydroxyl radical, a $C_{1-10}$, preferably $C_{1-4}$, alkyl radical; a radical of the formula $SO_2CF_3$; a radical of the formula $SO_2C_6F_5$; a radical of the formula $S-R^9$ where $R^9$ is as defined above; a radical of the formula $OSO_2R^{11}$ wherein $R^{11}$ is selected from the group consisting of $C_{1-20}$, preferably $C_{1-10}$, alkyl radicals, and $C_{6-14}$, preferably $C_{6-12}$ aryl radicals, a hydrogen atom; or a group 1, 2 or 3 metal, each $R^8$ is selected from the group consisting of a hydrogen atom, a $C_{1-4}$ alkyl radical, a $C_{1-4}$ alkoxide radical, a $C_{6-14}$, preferably $C_{6-12}$, aryl radicals; and a $C_{6-14}$, preferably $C_{6-12}$, aryl oxide radical, w is an integer from 1 to 5, preferably 1 to 3, most preferably 1, x is 0 or 1, and y is 0 or 1, provided the silicon compound contains a functional group or atom which reacts with the first aluminum compound (i.e. component (ii)).

Preferably the silicon containing compound contains a functional group selected from the group consisting of a hydroxyl radical, a $C_{1-10}$ alkoxy radical a $C_{6-14}$ aryloxide radical, a radical of the formula $OSO_2R^{11}$ wherein $R^{11}$ is selected from the group consisting of $C_{1-20}$ alkyl radicals, and $C_{6-14}$ aryl radicals, a lithium, sodium or potassium atom, a radical of the formula $NR^9R^{10}$ where $R^9$ and $R^{10}$ are independently selected from the group consisting of a hydrogen atom, a hydroxyl radical, a $C_{1-10}$ alkyl radical; a radical of the formula $S-R^9$ where $R^9$ is as defined above; a radical of the formula $SO_2CF_3$; and a radical of the formula $SO_2C_6F_5$.

In one embodiment of the invention each $R^8$ is independently selected from the group consisting of methyl, ethyl, methoxy, ethoxy, and phenyl radicals and a hydrogen atom.

In one embodiment of the invention A is selected from the group consisting of a methyl, ethyl, propyl, iso-propyl, methoxy, ethoxy, propyoxy, iso-propoxy, tertiary butyl, hydroxy, phenyl, phenoxy, benzyl and benzyloxy radicals.

In a further embodiment of the invention B is selected from the group consisting of a divalent methyl, ethyl, propyl, isopropyl, tertiary-butyl, phenyl, and benzyl radicals.

In a still further embodiment of the invention D is selected from the group consisting of a methoxy, ethoxy, propyoxy, iso-propoxy, phenoxy, benzyloxy radicals, a radical of the formula $SO_2CF_3$, a radical of the formula $SO_2C_6F_5$, and a hydrogen, lithium, sodium, or potassium atom.

The fourth component in the catalyst systems according to the present invention is a reactive alkyl halide (reactive halide) of the formula $R^3X$ wherein $R^3$ is a $C_{1-8}$, preferably a $C_{1-4}$, alkyl radical and X is a halide selected from the group consisting of chlorine and bromine. Preferably, the second component is t-butyl halide, most preferably t-butyl chloride.

The fifth component in the catalyst of the present invention is a transition metal halide of the formula $MX_4$, wherein M is a transition metal such as titanium, zirconium or hafnium, preferably titanium and X is a halide, preferably chloride. Preferably the transition metal halide is $TiCl_4$.

The optional sixth component in the catalyst of the present invention is an alkyl aluminum alkoxide of the formula $(R^4)_{3-a}Al^2(OR^7)_a$ wherein $R^4$ and $R^7$ are independently selected from the group consisting of $C_{1-10}$, preferably $C_{1-4}$ alkyl radicals and a is 1 or 0. A useful dialkyl aluminum alkoxide is diethyl aluminum ethoxide.

The first four components of the catalyst system are mixed to provide a molar ratio of $Mg:Al^1$ from 2.0:1 to 12:1, preferably 4:1 to 6:1, Mg:Ti from 3:1 to 8:1, preferably 4:1 to 6:1, a molar ratio of $Al^1$:transition metal from 0.25:1 to 4:1, preferably from 0.5:1 to 3:1; a molar ratio of (reactive) halide from component (iv) to Mg from 1.6:1 to 2.7:1, preferably from 1.8:1 to 2.4:1, and a molar ratio of $Al^1$:Si from 0.25:1 to 4:1, preferably from 0.5:1 to 3:1

The fifth component is optional and may used in an amount to provide a molar ratio of $Al^2$:transition metal (preferably titanium) 0:1 to 5:1, if it is used preferably it is present in an amount from 0.5:1 to 3:1.

In one embodiment of the present invention $R^1$, $R^3$, $R^4$, $R^5$ and $R^7$ are independently selected from the group consisting of $C_{1-4}$ alkyl radicals and preferably $R^1$, $R^4$, $R^5$ and $R^7$ are ethyl radicals.

While all of the components of the catalyst system may be mixed together at once, generally the first components are mixed together, optionally at room temperature to form a precursor which may be further activated by the sixth component.

In a further embodiment of the present invention all of the components of the catalyst or a preformed precursor which may be prepared by inline mixing (typically from one to two minutes) at a temperature from 20° C. to 180° C., typically form about 20° C. to 80° C., preferably from 20° C. to 60° C. for a time upto three or four hours, preferably less than an hour, typically from 5 seconds to 30 minutes. After preparation the catalyst may be stored in inert conditions (i.e. under an inert atmosphere).

The catalyst system of the present invention is used in the process of the invention without separation of any of the components of the catalyst. In particular, neither liquid nor solid fractions are separated from the catalyst before it is fed to the reactor. In addition, the catalyst and its components are not slurries. All the components are easy-to-handle, storable stable liquids.

The solvent containing monomers, catalyst or catalyst components, and optionally hydrogen are fed to the reactor and react under good mixing conditions for a short period of time, preferably less than 10 minutes.

The solution passing from the polymerization reactor is normally treated to deactivate any catalyst remaining in the solution. A variety of catalyst deactivators are known, examples of which include fatty acids, alkaline earth metal salts of aliphatic carboxylic acids and alcohols. The hydrocarbon solvent used for the deactivator is preferably the same as the solvent used in the polymerization process. If a different solvent is used, it must be compatible with the solvent used in the polymerization mixture and not cause adverse effects on the solvent recovery system associated with the polymerization process. The solvent may then be flashed off from the polymer, which subsequently may be extruded into water and cut into pellets or other suitable comminuted shapes. The recovered polymer may then be treated with saturated steam at atmospheric pressure to, for example, reduce the amount of volatile materials and improve polymer color. The treatment may be carried out for about 1 to 6 hours, following which the polymer may be dried and cooled with a stream of air for 1 to 4 hours.

Pigments, antioxidants, UV screeners, hindered amine light stabilizers and other additives may be added to the polymer either before or after the polymer is formed into pellets or other comminuted shapes. The antioxidant incorporated into polymer obtained from the process of the present invention may, in embodiments, be a single antioxidant, e.g. hindered phenolic antioxidant, or a mixture of antioxidants, e.g. a hindered phenolic antioxidant combined with a secondary antioxidant, e.g. phosphite. Both types of antioxidant are known in the art. For example, the ratio of phenolic antioxidant to secondary antioxidant may be in the range of 0.1:1 to 5:1 with the total amount of antioxidant being in the range of 200 to 3,000 ppm.

The present invention will now be illustrated by the following non-limiting examples. Unless otherwise indicated parts means part by weight and percent (%) is weight percent. In the following examples, unless indicated otherwise, the compound to give $Al^1$ was triethyl aluminum; the magnesium compound was butyl ethyl magnesium; the transition metal compound was $TiCl_4$; the halide compound was t-butyl chloride; and the compound providing the $Al^2$ was diethyl aluminum ethoxide.

Unless otherwise indicated the polymerizations were conducted using a small scale continuous polymerization unit. The polymerization was a solution polymerization of ethylene and octene conducted at 230° C. In all the experiments the feed rates were controlled so that the ratio of octene to ethylene was 0.5 (weight e.g. g/g). The feed rates of the catalyst components were controlled to provide a molar ratio of Mg/Ti of 5.0 and a molar ratio of chlorine from component (iv) to Mg of 2.2. The hold up time (HUT) in the reactor was 1 minute. The conversion (% Q) and the propagation rate constant (kp—liter of ethylene consumed per m mol of catalyst per minute of reaction time) were recorded together with the product properties of melt index (Mi—g of polymer per 10 min), density (D g/cc), the molecular weight (weight average Mw) and polydispersity (PD) of the polymer (Mw/Mn) were recorded.

EXAMPLE 1

A series of polymerizations were conducted using $Ph_3SiOH$ as the silicon containing compound (A and $R^8$ are phenyl radicals, w is 1, x is 0 and D is a hydrogen atom). The first aluminum component was triethyl aluminum ($R^1$ is ethyl and a is 0) and the second aluminum compound was present and was diethyl aluminum ethoxide ($R^4$ is ethyl, $R^7$ is ethyl and b is 1). In the experiment the mole ratio of $Al^2$:Ti was 2. In the control no silicon compound was used. The results of the experiment are set forth in Table 1.

TABLE 1

Use of $Ph_3SiOH$—$AlEt_3$ and $Et_2AlOEt$ in the Catalyst

| Run # | [Ti] (umol/L) | Si/Ti (mol/mol) | AlEt₃/Si (mol/mol) | AlEt₃/Ti (mol/mol) | % C2 Conv. | Kp (L/mmol Ti.min) | MI | Density (g/cc) | MW | PD |
|---|---|---|---|---|---|---|---|---|---|---|
| 1 | 270 | — | — | 1.0 | 87.66 | 26.3 | 16.5 | 0.9378 | 55800 | 4.16 |
| 2 | 270 | 2.0 | 0.5 | 1.0 | 92.51 | 45.7 | 17.3 | 0.9377 | 45200 | 3.25 |
| 3 | 270 | 1.0 | 1.0 | 1.0 | 92.70 | 47.0 | 15.9 | 0.9355 | 48500 | 3.13 |
| 4 | 270 | 0.5 | 2.0 | 1.0 | 93.56 | 53.8 | 32.2 | 0.9357 | 38900 | 2.92 |
| 5 | 240 | 1.0 | 0.94 | 0.94 | 88.64 | 32.5 | 24.4 | 0.9386 | 44100 | 3.58 |
| 6 | 240 | 0.5 | 1.0 | 0.5 | 86.65 | 27.0 | 12.0 | 0.9352 | 55600 | 3.07 |

Run 1 is a control with no silanol. Runs 2, 3 and 4 show higher conversions than the control run. In runs 5 and 6 a lower amount of titanium was used in the catalyst and comparable conversions were obtained. The poliydispersity (Mw/Mn) of the polymers made using the catalyst of the present invention is narrower than the control.

EXAMPLE 2

Example 1 was repeated except that the silicon compound was t-butyl $Me_2SiOH$ (i.e. A is t-butyl, $R^8$ is methyl, w is 1, x is 0 and D is a hydrogen atom). The first aluminum component was diethyl aluminum ethoxide ($R^4$ is ethyl, $R^7$ is ethyl and b is 1) and the second aluminum compound was present and was triethyl aluminum, combined with t-butyl $Me_2SiOH$, ($R^1$ is ethyl and a is 0). In the control no silicon compound was used. The results of the experiment are set forth in Table 2.

TABLE 2

| Run # | [Ti] (umol/L) | Si/Ti (mol/mol) | AlEt₃/Si (mol/mol) | AlEt₃/Ti (mol/mol) | % C2 Conv. | Kp (L/mmol Ti.min) | MI | Density (g/cc) | MW | PD |
|---|---|---|---|---|---|---|---|---|---|---|
| 1 | 270 | — | — | 1.0 | 87.66 | 26.3 | 16.5 | 0.9378 | 55800 | 4.2 |
| 7 | 270 | 1.0 | 1.0 | 1.0 | 91.83 | 41.6 | 32.7 | 0.9372 | 44600 | 3.6 |
| 8 | 270 | 1.5 | 1.0 | 1.5 | 91.78 | 41.4 | 37.9 | 0.9388 | 39000 | 3.5 |
| 9* | 270 | 1.0 | 1.0 | 1.0 | 90.60 | 35.7 | 38.5 | 0.9379 | 39100 | 3.4 |

The results show that the second component may be an aluminum alkyl combined with silanol and the first component may be an alkyl aluminum alkoxide and still there is a higher conversion than the control. Again, the polymers prepared in accordance with the present invention have a narrower polydispersity than the control.

EXAMPLE 3

Example 2 was repeated except that the first aluminum compound was triethyl aluminum combined with t-butyl Me$_2$SiOH and the second aluminum compound was diethyl aluminum ethoxide. The results of the experiment are shown in Table 3.

TABLE 3

| Run # | [Ti] (umol/L) | Si/Ti (mol/mol) | AlEt$_3$/Si (mol/mol) | AlEt$_3$/Ti (mol/mol) | % C2 Conv. | Kp (L/mmol Ti.min) | MI | Density (g/cc) | MW | PD |
|---|---|---|---|---|---|---|---|---|---|---|
| 1  | 270 | —   | —   | 1.00 | 87.66 | 26.3 | 16.5 | 0.9378 | 55800 | 4.2 |
| 10 | 270 | 1.0 | 1.0 | 1.00 | 94.46 | 63.2 | 48.0 | 0.9317 | 37200 | 2.8 |
| 11 | 165 | 1.0 | 1.0 | 1.00 | 87.59 | 42.8 | 24.5 | 0.9365 | 45300 | 3.4 |
| 12 | 165 | 1.5 | 1.0 | 1.50 | 87.34 | 41.8 | 26.4 | 0.9165 | 45300 | 2.9 |

Runs 11 and 12 of Table 3 show that when using the silicon containing catalyst of the present invention it is possible to reduce the titanium in the catalyst by up to about 40% and still maintain comparable ethylene conversion. Again the polymers prepared in accordance with the present invention have a narrower polydispersity than those prepared according to the prior art.

EXAMPLE 4

Example 3 was repeated except that either the second aluminum compound was omitted or significantly reduced. The first aluminum alkyl was triethyl aluminum combined with t-butyl Me$_2$SiOH. The results are set forth in Table 4.

TABLE 4

| Run # | [Ti] (umol/L) | AlEt3/Ti (mol/mol) | Si/AlEt3 (mol/mol) | Et2AlOEt/Ti (mol/mol) | Q-FE % | Kp (L/mmol Ti.min) | MI | Density (g/cc) | MW | PD |
|---|---|---|---|---|---|---|---|---|---|---|
| 13 | 317 | 1.1 | —   | 2.0 | 87.62 | 27.2 | —    | 0.9389 | 42400 | 3.5 |
| 14 | 317 | 1.1 | 0.9 | —   | 71.75 | 8.0  | —    | —      | —     | —   |
| 15 | 317 | 1.6 | 0.9 | —   | 88.75 | 24.9 | 26.0 | 0.9341 | 41700 | 3.3 |
| 16 | 317 | 2.2 | 0.9 | —   | 95.11 | 61.3 | 102.2 | 0.9318 | 30400 | 3.1 |
| 17 | 317 | 2.7 | 0.9 | —   | 95.26 | 63.4 | 73.1 | 0.9326 | 30900 | 3.2 |
| 18 | 317 | 2.2 | 0.9 | 0.5 | 95.05 | 60.5 | 70.8 | 0.9344 | 35500 | 3.5 |
| 19 | 317 | 2.2 | 0.9 | 1.0 | 95.20 | 62.5 | 88.8 | 0.9345 | 31900 | 3.4 |

Table 4 shows it is possible to eliminate the second aluminum component and still maintain a good ethylene conversion.

What is claimed is:

1. A catalyst consisting of a mixture of:

(i) a magnesium compound of the formula $(R^2)_2Mg$ wherein $R^2$ is a $C_{1-6}$ alkyl radical;

(ii) an alkyl aluminum compound of the formula $(R^1)_{3-a}Al^1(OR^5)_a$ and, wherein $R^1$ and $R^5$ are independently selected from the group consisting of $C_{1-4}$ alkyl radicals and a is 0 or 1;

(iii) a silicon containing compound of the formula:

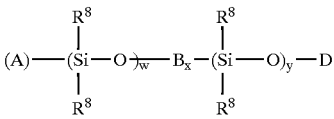

wherein each A is independently selected from the group consisting of $C_{1-10}$ alkyl radicals; $C_{1-10}$ alkoxide radicals; $C_{6-12}$ aryl radicals; $C_{6-12}$ aryl oxide radicals; and a hydroxy radical, B is selected from the group consisting of divalent $C_{1-4}$ alkyl radicals and divalent $C_{6-12}$ aryl radicals which is unsubstituted or up to fully substituted by one or more $C_{1-4}$ alkyl radicals, D is selected from the group consisting of a hydrogen atom, $C_{1-10}$ alkyl radicals; $C_{1-10}$ alkoxide radicals; $C_{6-12}$ aryl radicals; $C_{6-12}$ aryl oxide radicals; an amine radical or the formula $NR^9R^{10}$ where $R^9$ and $R^{10}$ are independently selected from the group consisting of a hydrogen atom; a hydroxyl radical; a $C_{1-4}$ alkyl radical; a radical of the formula $SO_2CF_3$; radical of the formula $SO_2C_6F_5$; a radical of the formula $S-R^9$ is as defined above; a radical of the formula $OSO_2R^{11}$ wherein $R^{11}$ is selected from the group consisting of $C_{1-10}$ alkyl radicals, and $C_{6-12}$ aryl radicals, a hydrogen atom; or a group 1, 2 or 3 metal, each $R^8$ is selected from the group consisting of a hydrogen atom, a $C_{1-4}$ alkyl radical, a $C_{1-4}$ alkoxide radical, a $C_{6-12}$ aryl radical; a $C_{6-12}$ aryl oxide radical; w is an integer from 1 to 3, x is 0 or 1, and y is 0 or 1, provided the silicon compound contains a functional group or atom which reacts with the above aluminum compound;

(iv) a halide of the formula $R^3X$, wherein $R^3$ is a $C_{1-4}$ alkyl radical and x is a halide selected from the group consisting of chlorine and bromine;

(v) titanium tetrachloride, to provide a molar ratio of Mg to $Al^1$ from 4.0:1 to 6:1; Mg:Ti from 4 to 6; a molar ratio of $Al^1$ to Ti from 0.5:1 to 3:1; a molar ratio of halide to Mg from 1.8:1 to 2.4:1; a molar ratio of Si:Ti from 0.5:1 to 3:1 and a molar ratio of $Al^1$:Si from 0.5:1 to 3:1; and (vi) optionally an alkyl aluminum compound of the formula $(R^4)_{3-b}Al^2(OR^7)_b$, wherein $R^4$ and $R^7$ are independently selected from the group consisting of $C_{1-4}$ alkyl radicals and b is 1 or 0 to provide: a molar ratio of $Al^2$ to Ti from 0:1 to 5:1.

2. The catalyst according to claim 1, wherein $R^3$ is a tertiary butyl radical.

3. The catalyst according to claim 2, wherein each $R^8$ is independently selected from the group consisting of methyl, ethyl, methoxy, ethoxy and phenyl radicals and a hydrogen atom.

4. The catalyst according to claim 3, wherein A is selected from the group consisting of a methyl, ethyl, propyl, iso-propyl, methoxy, ethoxy, propyoxy, iso-propoxy, tertiary butyl, hydroxy, phenyl, phenoxy, benzyl and benzyloxy radicals.

5. The catalyst according to claim 4, wherein B is selected from the group consisting of a divalent methyl, ethyl, propyl, isopropyl, tertiary butyl, phenyl, and benzyl radicals.

6. The catalyst according to claim 5, wherein D is selected from the group consisting of a methoxy, ethoxy, propyoxy, iso-propoxy, phenoxy, benzyloxy radicals, a radical of the formula $SO_2CF_3$, a radical of the formula $SO_2C_6F_5$, and a hydrogen, lithium, sodium, or potassium atom.

* * * * *